United States Patent Office 3,130,054
Patented Apr. 21, 1964

3,130,054
METHOD OF PRODUCING A FOOD SUPPLEMENT
Milton E. Parker, Barrington, Ill., assignor, by mesne assignments, to W. R. Grace & Co., New York, N.Y., a corporation of Connecticut
No Drawing. Filed Mar. 14, 1960, Ser. No. 14,518
2 Claims. (Cl. 99—2)

This invention relates to comestibles and more particularly to unique, free-flowing, substantially non-hygroscopic, particulate, nutritive supplements, composed of animal and/or vegetable tissues, exudates, sera, extracts and the like integrated with a sponge-like mineral such as exfoliated or expanded vermiculite.

In the formulation of animal and poultry feeds, for example, it is frequently desirable to include as components, materials which have peculiar and distinctive nutritional properties, or flavor appeals, but whose incorporation in a formulated feed presents problems in achieving uniform and effective distribution throughout the relatively dry feed masses which comprise normal or specific animal rations. This is particularly true of those feedstuff components or ingredients which are normally in liquid form and which, because of their indigenous hygroscopic character, do not permit of their ready drying and subsequent dry storage under normal variated temperature and relative humidity conditions.

Many animal feed millers confine their formulations to the use of normally dry components inasmuch as special equipment and skill is usually required in order to introduce wet materials into dry animal feeds and to distribute them uniformly while avoiding overheating, molding, spontaneous combustion and related spoilage manifestations in the resultant comestible mixtures. For this reason, feed millers customarily purchase what are known as feed concentrates or pre-mixes for addition to, and for admixture with, the basic dry grains or meals which constitute the greater proportion of the finally formulated feed.

To the end of providing an improved means for permitting the feed miller to produce animal and poultry feeds containing animal and vegetable nutrients, I have discovered that exfoliated vermiculite can be combined with many such nutritive materials, either in liquid or solid form, so that the resulting feed supplement, with or without subsequent drying can be admixed with dry grains or meals usually employed as the major components of formulated animal feeds simply, economically and with no inordinate waste, or significant impairment, of the nutritive and inherent organoleptic qualities of the supplement as well as the finished formulated feed of which it becomes a component. Furthermore, my novel food supplement, as well as the formulated feed with which it is integrated, becomes and remains substantially non-hygroscopic.

The exfoliated or expanded vermiculite used in my invention is normally produced by heating in furnaces at elevated temperatures and is commercially available. Vermiculite is also expanded by chemical processes in solutions. For some biological purposes this form may be preferred because in general chemically exfoliated vermiculite has significantly higher ion-exchange capacity than thermally expanded material.

Among the nutritive materials of especial interest which can be used in producing animal and/or vegetable feed supplements in accordance with my invention are, illustratively, whole fish, fish solubles, whey, blackstrap molasses, sweet potatoes, okra, tallow, yellow grease, chicken fat, vegetable oils, a variety of fermentation products such as condensed corn steep water and distillers' solubles, vitamins such as vitamins A, E, B complex, and protein hydrolysates including both animal and vegetable source materials such as meat extracts and enzymatically digested corn gluten, urea and a host of other nutrients which are inherently hygroscopic when dried and subjected to normal storage conditions of humidity and temperature.

The compositions of my invention are additionally characterized by possessing both growth-stimulating properties and enhanced acceptability properties depending on the ingesting host.

Extensive research work conducted within recent years has established the existence of growth-stimulating nutrients in such natural animal feed ingredients as fish solubles, whey and alfalfa meal which are referred to as "unidentified growth factors." Basically, both fish solubles and whey are not only distinctive in their growth-stimulating properties to such a degree that their nutritional potencies have been further classified as "fish factor" and "whey factor," but jointly are known to be troublesome in feed formulations because of their inherent hygroscopic properties. Alfalfa meal while also recognized as a source of unidentified growth factors, is normally not hygroscopic but as a carrier of both fish solubles and whey has rather specific limitations in arresting or correcting their inherent hygroscopic properties. Nevertheless, these natural products because of their indigenous growth-stimulating properties have enjoyed wide acceptance among animal nutritionists and are particularly employed in so-called "starter rations" in the feeding of young poultry and swine and with demonstrable economic advantages from the standpoint of effective and efficient utilization of their total feed consumption.

More recently, grain fermentation products having their sources in such products as distillers' solubles as well as other fermentation sources of vitamin $B_{12}$ and other simulated biological agents have been demonstrated to display definite potencies of unidentified growth factors and have found more limited acceptance in commercial animal feed formulations; these products, too, possess definite hygroscopic characteristics.

However, of all these various feed supplements, fish solubles still enjoys a relatively higher degree of commercial acceptance with whey and alfalfa meal being of somewhat lesser general, and therefore, more varied and complementary utility. Incidentally, fish meal also has definite growth-stimulating properties, though of relatively lesser potency than fish solubles, and consequently must be used in correspondingly higher concentration than the latter for comparable nutritional benefits.

Fish solubles is the term applied to the condensed serous portion of fish from which most of the natural fat or oil has been removed. It is one of the major by-products recovered in fish reduction practices. In producing fish solubles, whole fish, fish scrap, and/or eviscerated gurry are ground and cooked primarily to release the normal fat or oil content of these raw materials. The cooked mass is then fed through a continuous filter press in order to express the serous portions, which are commonly referred to as stick water. The pressed residue, or presscake, is usually dried in rotary driers and is the fish meal of commerce. The stick water is centrifuged in order to separate the oil, which latter portion may undergo subsequent refining to produce the various grades of the fish oils of commerce. The skimmed stick water is then condensed under reduced pressure in vaccum pans, or similar equipment, to produce what is commonly known as condensed fish solubles, a product which usually contains about 50% fish solubles solids by weight. This product, i.e., condensed fish solubles, has never been successfully dried commercially to a solids content substantially higher than 50% by weight due to the fact that its proteinaceous constituents possess such a high degree of hygroscopicity as to preclude its effective drying and particularly its subsequent dry storage. In instances where fish solubles have been dried experimentally to a very high solids content the dried product has been found to absorb moisture so quickly and tenaciously, and thus become so tacky and sticky that handling and bagging the resulting product is commercially impractical. Furthermore, the product, even when it has been packaged, cakes so badly on storage that utilizing the caked material poses many troublesome problems in feed formulating operations.

Dry products have been produced by drying condensed fish solubles on such products as soybean oil meal and alfalfa meal. A commercial product which is prepared by mixing one part by weight of 44% protein content soybean oil meal and two parts by weight of condensed fish solubles containing approximately 32% crude protein, followed by drying of the mixture results in a product containing approximately 50% total protein by weight—or about 18% leguminous protein and 32% fish solubles protein. This product contains substantially one-half leguminous solids and one-half fish solubles solids—the vegetable or leguminous solids having merely replaced the original 50% moisture content of the condensed fish solubles.

A similar commercial product may be prepared by mixing one part by weight of alfalfa meal and two parts by weight of condensed fish solubles to produce a finished dried product of essentially the same proportion of leguminous solids and fish solubles solids as described above. Although this product will theoretically contain only 40% total protein content—or approximately 32% fish solubles protein and 8% vegetable protein, since alfalfa meal is a more potent source of unidentified growth factors than is soybean oil meal, it results in a more satisfactory final product insofar as its resulting growth-stimulating properties are concerned. However, neither of the foregoing products—the combined soybean-fish solubles or the combined alfalfa-fish solubles products—has a basic fish solubles content which is any higher than that of conventional condensed fish solubles.

In accordance with my invention I am able to produce a unique dry, relatively non-hygroscopic product of greatly increased fish solubles content by mixing increased quantities of condensed fish solubles with relatively lesser concentrations of exfoliated vermiculite than is possible to obtain with either soybean oil meal or alfalfa meal. Due to the enormous drying surface areas per unit of volume of exfoliated vermiculite (which has basically from one-fourth to one-third the bulk density of either the soybean oil meal or the alfalfa meal) used in my novel product, the moisture in the condensed fish solubles is much more readily removed without resort to the relatively high drying temperatures that are necessary in attempting to dry condensed fish solubles on a drum or rotary drier in admixture with such leguminous carriers. With the exfoliated vermiculite carrier, no recycling of the condensed fish solubles-vermiculite mixture is necessary when using a drum drier and without the operational difficulties encountered with the leguminous carriers in comparably low concentrations as contrasted with that of the condensed fish solubles even when its solids contents are as high as 80-85% of the dry weight of the finished product.

Furthermore, my new product is characterized by its extremely high, surprising and unexpected resistance to any subsequent absorption of moisture vapor even when the vermiculite concentration is in proportionately lesser amounts such as 10% to 20% by weight, for example. This is especially surprising in view of the tenaciously hygroscopic character of many of the supplements of plant and animal origin which I can use in formulating my new food supplement.

Among other important, illustrative advantages of my invention is that:

(1) The amount of my improved product to be used in formulating a feed mixture can be materially reduced dependent on the concentration of fish solubles solids it contains, and (2) It permits the feed formulator, e.g., the miller who is generally restricted to dry mixing practices, to forego the expense of installing additional mixing equipment should he desire to incorporate fish solubles or other liquefied fish concentrates into his animal feed formulations in such dry form.

The product of my invention can be made so that it contains substantially more than 50% fish solubles solids by increasing the proportion of fish solubles solids to the vermiculite carrier used beyond the 50% fish solubles solids concentration such as apparently limits the utilization of the leguminous carriers as set forth above. In other words, the leguminous carriers normally replace only the approximate 50% moisture content of conventional condensed fish solubles.

In practice these increased concentrations of fish solubles on the vermiculite carrier can be dried in one operation if a drum dryer or a steam-jacketed dry rendering kettle is used. On the other hand, if a conventional rotary dryer is to be used I prefer to perform the drying of a fish soluble solids containing more than 50% fish soluble solids by recycling, which necessitates adding condensed fish solubles to a pre-dried product containing from 50% to 65% fish solubles solids and mixing before its final drying.

For example, in producing a product of high fish solubles content, one part by weight of a dry non-hygroscopic fish solubles solids product containing one-half part by weight of vermiculite is first made as herein above described, and this pre-dried product is then mixed with two parts by weight of condensed fish solubles, followed by drying such recycled mixture to result in a final product containing 80% to 85% fish solubles solids.

There are, of course, a number of ways of adjusting the fish solubles solids concentration of my novel product, the natural limiting factors, as those skilled in the art will recognize, being set by the amounts of fish solubles the exfoliated vermiculite will absorb and still permit of ready handling and drying operations through a rotary dryer. The size of the exfoliated vermiculite particles used is also a factor as is its handling during mixing and drying so as to avoid excessive fracturing which tends to limit the amount of the fish solubles solids which can adhere, be dried, and still result in a relatively non-hygroscopic product. Any tendency towards powdering of the dry fish solubles per se is not only an indication of its possible diminishing absorption by the vermiculite but also can indicate a corresponding tendency to reduce its non-hygroscopicity of the product. This can be minimized by a final grinding of the finished product as the incidental intimate mixing effects tends to accentuate the imparted non-hygroscopicity.

Normally, exfoliated vermiculite, 95% by volume of which would be retained on a 30 mesh screen with less than 10% by volume retained on an 8 mesh screen, will enable the drying of a non-hygroscopic fish solubles product containing up to 65% fish solubles solids when using a conventional rotary dryer without having to resort to recycling. However, to increase the fish solubles solids to 80% to 85% by weight, it will be necessary to recycle adding sufficient condensed fish solubles to the pre-dried 50% to 65% fish solubles solids product so as to result in an ultimate final product containing 80% to 85% by weight of fish solubles solids.

Those skilled in the art will of course understand that, depending on conditions of formulation, the particular kind of animal for whom the feed is to be formulated, and the like, the particle size of the vermiculite may vary tremendously over, and even beyond the particle size ranges represented by #0 to #5.

Factors such as the temperature, moisture content and particulate size of the exfoliated vermiculite, the temperature and composition of the condensed fish solubles being used, as well as pressure means of mixing, all have an effect on the quantity of condensed fish solubles that any predetermined amount of thermally exfoliated vermiculite will absorb and still permit its ready handling during its subsequent handling and drying steps.

Not only does use of conventional heat expanded vermiculite in producing the novel products of this invention not detract from the natural unidentified growth factor potency of the original condensed fish solubles solids whose moisture it replaces, but an increase in the growth-stimulatory effect of my product over fish solubles per se seems due to some not entirely understood synergistic and/or complexing effect provided by the vermiculite on the ingesting animal's absorption of the mineral components thereof. This effect can apparently be increased slightly if the condensed fish solubles is first acid treated by adjusting its reactions with sufficient mineral acid to result in a pH of 4.5 or lower prior to its admixture to any exfoliated vermiculite carrier.

In this regard, I have found that feeding chicks with my unique fish solubles-vermiculite product resulted in a significant increase in feed efficiency when compared with the same amount of fish solubles per se. The chicks gained substantially more weight on the same amount of feed when the diet was supplemented with vermiculite-fish solubles than with fish solubles alone.

While I am not certain at this time of the reason why this new and unexpected result occurs, it appears as though it might be due to substantially reducing, if not practically eliminating the recycling of minerals in animal physiology induced by the vermiculite carrier as a complexing agent. In other words complexing agents in the digestive tract of an animal may reduce the speed of absorption of minerals without interfering with their availability, thus allowing complexing agents to maintain an electrolyte balance that is beneficial to the animal. That is to say ingestion of my new composition allows the animal to use the minerals needed while at the same time preventing mineral antagonism, any mineral excess being eliminated in the feces of the ingesting animal and not absorbed in its urine as is ordinarily the case.

In producing acceptably dry, non-hygroscopic fish solubles products, or similar products containing hygroscopic substances or materials, such as corn solubles (concentrated corn steep water), whey, most fermentation products, some vitamins and similar nutrients, it is important that the temperature of the dried finished products normally not exceed 180° F. for any extensive period of time, and preferably not longer than about five to ten minutes. It usually is also important that the product is dried so that its moisture content does not exceed about 10% by weight and preferably not more than 5% by weight. Most dried products may be packed in a heated condition provided that temperatures normally do not exceed 125° F. To maintain these critical temperature conditions of drying and packaging in synchronized continuous operations, it is usually necessary to have a heat exchanger of suitable design and capacity so as to cool the heated products upon their discharge from the dryer. The latter is particularly desirable in the instances of drying protein hydrolysates on exfoliated vermiculite carriers for such substances as meat extracts or vegetable digests such as are often used in flavoring soups, etc.

The foregoing discussion of the various details involved in the production of a dry, non-hygroscopic fish solubles product utilizing an exfoliated vermiculite carrier is illustrative of the general precautions to be observed in drying any liquid hygroscopic substances on an exfoliated vermiculite carrier. Obviously, to avoid impairment of the nutritive and organoleptic qualities of the material being dried, it will be necessary to adjust and modify drying conditions consistent with critical time and temperature factors as above pointed out.

In mixing liquid materials with thermally exfoliated vermiculite, the best results are obtained by spraying the liquid onto the falling mass of exfoliated vermiculite in a tumble mixer. Because of the interstitial spaces within the structure of an exfoliated vermiculite particle, high capillary forces are brought into play which cause the expanded or exfoliated vermiculite to act as a mineral sponge. Thus, when liquids are sprayed into a falling mass of exfoliated vermiculite, there is an immediate absorption of such liquid in a most intimate manner. Furthermore, such type of mixing minimizes fracture of the vermiculite particles and thus maintains conditions for maximum absorption of any applied liquids.

In some instances, the amount of liquid feed supplement which can be integrated with the expanded vermiculite and still be effectively dried can be increased by using pressure mixing means to obtain maximum absorption of the liquid feed stuff. This had been found desirable in producing a dry, relatively non-hygroscopic black strap molasses product on a vermiculite carrier. A tumble type mixer equipped to be closed air-tight and either evacuated or pressurized, with means for introducing a liquid while the contained expanded vermiculite is under vacuum or pressure will increase the amount that can be absorbed by, or reacted with the vermiculite. Using this technique and means, and by way of example, 150 pounds of expanded vermiculite, 95% by volume of which will be retained on a 30 mesh screen with less than 10% on an 8 mesh screen, will readily absorb a hot mixture (approximately 250° F.) of 350 pounds of black strap molasses and 50 pounds of water when mixed with pressure means as described above. Adequate drying of such molasses-vermiculite mixture can be obtained upon operating a rotary dryer with an exit dry-bulb air temperature of approximately 170° F. The dry product may be subsequently recycled with additional black strap molasses to provide a product containing at least 80% black strap molasses solids. The black strap molasses-vermiculite product, although relatively non-hygroscopic, can be made more so by introducing from about 2% to 5% by weight of anhydrous sodium sulphate and mixing with the final dried product. The resulting product will be granular, free flowing and should preferably be packaged in moisture-proof bags. Any anhydrous or monohydrate metallic sulphate of nutritionally essential or trace element significance may be used in place of anhydrous sodium sulphate including such salts of cobalt, copper, iron, magnesium, manganese, zinc, etc. Dibasic and tribasic sodium phosphate and the phosphate salts of cobalt, copper, iron, magnesium, manganese, zinc and the like may also be used.

An additional and unexpected attribute of the molasses-vermiculite products of my invention is that, unlike molasses-legume mixtures for example, the former will have more highly accented flavor characteristics due to the fact that vermiculite (unlike legumes) does not minimize, dilute or dissipate the flavor of the molasses or any other solubles associated with it.

I have also discovered that though some hygroscopic products while in a liquid state do not lend themselves for processing on a vermiculite carrier, they can, nevertheless, be rendered relatively non-hygroscopic by dusting them in a dry form with finely ground exfoliated vermiculite. Examples of such products include urea such as is used in ruminant nutrition, the anhydrous phosphate and sulphate salts of such trace minerals such as cobalt, manganese, zinc, copper, etc., and the pelleted forms of formulated feeds containing hygroscopic ingredients such as black strap molasses and condensed fish solubles.

Freshly made urea admixed with 5% to 10% by weight of finely ground exfoliated vermiculite, 95% of which by volume will pass through a 100 mesh screen, will result in a relatively non-hygroscopic product and can effectively be so used to replace such carriers as kaolin and millfeed. Similar treatment of anhydrous phosphate and sulphate salts as well as choline chloride will preclude their tendency to pick up moisture from humid environments in feed concentrates and premixes in which they might be incorporated as a source of trace mineral or vitaminic elements.

The dusting of pelleted feeds containing hygroscopic ingredients with finely ground vermiculite (as specified above) will reduce their tendency to stick and pack in bulk storage and in stacked packages. The concentration of such finely ground exfoliated vermiculite will depend upon the surface area of the pellets being treated to render them relatively non-hygroscopic, though usually from 1% to 5% by weight of the pelleted feed will be adequate.

When a material having a high moisture content, but not necessarily in the form of a liquid, is used, for example sweet potatoes, the tubers are ground as finely as possible and the resulting mass is then mixed with the expanded vermiculite prior to its subsequent drying in a rotary dryer. Usually around 30% by weight of expanded vermiculite will provide a mixture permitting ready handling into the rotary dryer for subsequent drying. Such a sweet potato-vermiculite mixture will be dried readily at a temperature not exceeding 150° F. for not over 20 minutes in a rotary dryer. It is preferable to dry the product until the moisture content is not less than 8% by weight to minimize dusting so that such dry product can also be recycled with additional sweet potato charge for the final vermiculite product to be approximately 15% by weight with a corresponding 85% by weight of dry sweet potato solids. Similar results have been obtained with okra, horse-radish, etc.

There are also instances where I choose to utilize thermally exfoliated vermiculite as a carrier of a liquid nutrient without involving subsequent drying. In such instances I use the mixing technique described above in preparing dry non-hygroscopic black strap molasses product. I use such mixing technique where the product to be "carried" in and on the exfoliated vermiculite is a stabilized oleaginous material, such as tallow, yellow grease, chicken grease and similar high energy ingredients, including oils and fats containing flavor imparting qualities. The particular fatty or oily substance which is to be absorbed is heated to a temperature which is sufficiently above its melting point to assure that no crystallization of the fat will occur during processing. A temperature of 250° F. usually suffices, and I use a tumble type mixer into which a charge of expanded vermiculite is introduced, following which the mixer is closed, the mixer being provided with means for introducing the hot oil as a spray under pressure, spray nozzles being disposed within the mixer to present atomized oil to the falling mass of expanded vermiculite thereby insuring maximum absorption resulting in the production of a uniform and dry appearing product, which is superior to that which is possible when using a tumble mixer operated at atmospheric pressure. An internal processing pressure of 10 p.s.i. gauge is generally adequate. The pressure differential can also be obtained by reducing the pressure below atmospheric within the vacuum producing means which latter condition is desirable in the case of readily oxidizable materials, for example. In addition to oleaginous substances, I have found that oil soluble antioxidants such as Santoquin as manufactured by the Monsanto Chemical Company of St. Louis, Missouri, as well as liquid essential oils can be similarly admixed with exfoliated vermiculite without the necessity of any subsequent drying means.

In the event that any of the foregoing products are to be subjected to extended exposure to inordinately high humidity conditions, it is desirable to package the product while still warm (and thus relatively dry) in appropriately designed multi-ply laminated paper bags. Additional insurance against developing a high moisture content in a humid atmosphere may be provided by incorporating from 2% to 5% by weight of anhydrous sodium sulphate to any dried food supplement product on a vermiculite carrier.

In the case of the finely ground exfoliated vermiculite used for dusting and dry mixing purposes its preliminary admixture with approximately 2% by weight of anhydrous sodium sulphate proves very effective in delaying moisture pick-up by any relatively dry and inherently hygroscopic material with which it has been treated and subsequently subjected to prolonged exposure to humid conditions.

While my invention is particularly useful in the production of feed supplements and formulated feeds for animal use it should be understood, however, that the products of my invention are not necessarily restricted to animal feed formulations inasmuch as there are obvious counterparts in human nutrition. Consequently, the foregoing disclosure of animal feed supplement products of my invention will suggest to those skilled in the art similar applications to food supplements utilizable in human nutrition.

I claim:

1. The method for producing a food supplement which comprises adding a liquid nutrient to exfoliated vermiculite while said vermiculite is in a closed chamber under pressure in excess of atmospheric, mixing said nutrient and vermiculite at said pressure, reducing the said pressure to atmospheric, introducing into the said chamber from about 2% to 5% of powdered and anhydrous material selected from the group consisting of mineral phosphates and sulphates, mixing said anhydrous material with the mixture in the chamber, and drying the resulting mixture to produce a granular, free-flowing, dry-to-the-touch, non-hygroscopic product.

2. A method of producing a food supplement which comprises adding a nutrient in liquid form to exfoliated vermiculite in a closed chamber while said chamber is maintained at a pressure less than atmospheric pressure, mixing said nutrient and vermiculite at said lower pressure, increasing the pressure in said chamber above said lower pressure, mixing with the resulting product from about 2% to 5% of powdered and anhydrous material selected from the group consisting of mineral phosphates and sulphates, and drying the resulting mixture to produce a granular, free-flowing, dry-to-the-touch, non-hygroscopic product.

References Cited in the file of this patent

UNITED STATES PATENTS

| | | |
|---|---|---|
| 1,972,390 | Miner | Sept. 4, 1934 |
| 2,341,800 | Martin et al. | Feb. 15, 1944 |
| 2,486,426 | McGaha | Nov. 1, 1949 |
| 2,669,510 | Dresser | Feb. 16, 1954 |
| 2,739,063 | Wehrmeister | Mar. 20, 1956 |
| 2,791,496 | Rice | May 7, 1957 |
| 2,858,215 | Espoy | Oct. 28, 1958 |
| 2,879,161 | Valentine | Mar. 24, 1959 |
| 2,922,697 | Bell et al. | Jan. 26, 1960 |
| 3,003,880 | Erickson | Oct. 10, 1961 |